United States Patent [19]

Harvey et al.

[11] Patent Number: 4,491,775
[45] Date of Patent: Jan. 1, 1985

[54] MOTOR OPERATING PARAMETER SENSING APPARATUS

[75] Inventors: Raymond G. A. Harvey, Greenham; David S. Evans, Highcleve, both of England

[73] Assignee: Colin Frank Norton, Andover, England

[21] Appl. No.: 315,052

[22] Filed: Oct. 26, 1981

[51] Int. Cl.³ .................................. H02K 17/34
[52] U.S. Cl. .................... 318/434; 318/810; 318/282; 318/599; 318/440; 318/286
[58] Field of Search ............... 318/282, 286, 432, 434, 318/440, 467, 468, 569, 601, 571, 599, 594, 739, 810

[56] References Cited

U.S. PATENT DOCUMENTS

| | | |
|---|---|---|
| 2,940,038 | 6/1960 | Probert . |
| 3,322,994 | 5/1967 | Dever et al. ............ 318/440 X |
| 3,612,972 | 10/1971 | Konig ....................... 318/227 |
| 3,997,826 | 12/1976 | Mayer ...................... 318/286 X |
| 4,016,432 | 4/1977 | Marzalek ................ 307/233 A |
| 4,084,120 | 4/1978 | Lund ........................ 318/599 |
| 4,091,662 | 5/1978 | Emanuel .................. 73/116 |
| 4,097,786 | 6/1978 | Lund ........................ 318/282 |
| 4,227,137 | 10/1980 | Hartman ................. 318/810 X |
| 4,364,111 | 12/1982 | Jocz ....................... 318/466 X |

FOREIGN PATENT DOCUMENTS 2554771 6/1977 Fed. Rep. of Germany .

OTHER PUBLICATIONS

Boehm, V. et al., "A Digital Instrument for Measuring the Slippage of Asynchronous Motors", Electronic Engineering, Feb. 1967, pp. 106–109.

*Primary Examiner*—J. V. Truhe
*Assistant Examiner*—Paul Shik Luen Ip
*Attorney, Agent, or Firm*—Laubscher, Philpitt & Laubscher

[57] ABSTRACT

A motor operated valve, typically a butterfly valve driven by a synchronous electric motor (16), is provided with a torque sensing arrangement wherein an cyclic electrical signal representative of the rotational speed of the motor is produced by magnets (22) on disc driven by the motor and Hall effect switches (23,24). The frequency of this signal is compared in a circuit (43) with the frequency of current supplied to the motor to provide an indication of motor torque. Switches (46,47) define preset torque limits for the valve. If the limits are exceeded, a signal is fed to control logic (41) which operates switches (18) to control the supply current to the motor. The speed signal from the Hall effect switches is also fed to a counter (31) to develop a count representative of movement of the valve. The output of counter (31) is compared with preset valves defined by switch circuits (37,38) to define limits of travel for the valve.

7 Claims, 2 Drawing Figures

MOTOR OPERATING PARAMETER SENSING APPARATUS

BRIEF DESCRIPTION OF THE PRIOR ART

This invention relates to motor operated valves, for example valves operated by electric or hydraulic motors.

In many industrial applications such as process plants, valves are opened and closed by electric or hydraulic motors. A typical example is a motor-driven butterfly valve fitted in a hydraulic or pneumatic flow system. The flow in the system can only be stemmed reliably if the valve's movable valve member is closed at a seating pressure greater than the maximum flow pressure that can occur in the system. The torque required from the motor to achieve closure of the valve is known as the seating torque. The valve motor thus needs to be capable of exerting the seating torque with some reserve power.

Consequently, in the absence of some reliable control to stop the motor, the motor would drive the valve shut and then continue running and possibly damage the valve before the motor became overloaded and tripped or stalled. Accordingly, mechanical limit switches have been provided to define open and shut positions for the valve such that the valve motor will drive the valve member until a limit switch is encountered and the switch will then operate to switch off the motor. Also a mechanical arrangement is conventionally provided to limit the maximum motor torque. The torque limiting arrangement usually consists of a spring which is tensioned by the motor drive in dependence upon the motor torque, the spring actuating a switch to turn off the motor if the torque becomes too great. Thus, for example, if a foreign object becomes jammed in the valve, the valve motor will shut off rather than damage the valve. The known mechanical arrangements for controlling the motor movement and torque are bulky and take up a significant amount of space. Also, the mechanical switches are prone to wear and mechanical failures. Furthermore, the switches have to be carefully adjusted in terms of their position to ensure that they will operate as desired. The switches and spring arrangement usually has to be specially designed for different models and sizes of valve.

SUMMARY OF THE INVENTION

The present invention provides a motor-operated valve characterized by an improved torque control means wherein means are provided to produce a signal representative of the actual speed of the motor and means are provided to operate on this signal to derive a torque signal representative of the torque developed by the motor. The torque signal is fed to torque limit means which compares the value of the torque signal with a preset value thereof, and driving power to the motor is controlled in dependence upon the output of the torque limit means, so that the motor is not permitted to exert an excessive torque on the valve.

The motor operated valve according to the invention has the advantage that the prior bulky mechanical torque limiting arrangement is eliminated and the torque limit can easily be adjusted by altering the preset value of the torque signal. Thus the delicate adjustment of spring tension of the prior art is no longer required. Also a single design of improved torque control means can be used with different valve housings and motors, whereas in the past the torque control mechanism was usually specially designed for each size and model of valve.

As previously mentioned, the signal representative of the torque of the motor is produced in accordance with the invention by operating upon a signal representative of the actual speed of the motor. When a motor is driven so that it will assume a given speed under particular load conditions, and the load conditions are then charged, the motor speed changes and this speed change is a function of the torque exerted by the motor against the changed load. Thus, if the valve motor is driven by a constant supply of power, the motor will under a given light load assume a particular speed, but when the load increases its speed decreases. Thus, the actual motor speed is a function of motor torque and this is used to determine motor torque in the invention.

Typically, the motor will for given load conditions operate at a speed determined by a parameter of driving power supplied to the motor. Preferably the torque signal is produced by comparing the actual motor speed signal with a signal which is a function of said parameter of the power supplied to the motor so as to compensate automatically in the torque signal for any variations in the power supply to the motor.

Preferably the actual motor speed signal is a cyclic signal of which successive cycles are indicative of increments of movement of the valve member. Preferably a counter is provided to count the cycles to provide an indication of the position of the valve member. Means may be provided to define signals representative of preset limits of movement of the valve member for comparison with the valve position as defined by the count in the counter. These preset movement limit signals overcome the need for mechanical limit switches as in the prior art, and the values of the signals can easily be adjusted without having to make positional adjustments of switches on the valve.

BRIEF DESCRIPTION OF THE DRAWINGS

In order that the invention may be more fully understood an embodiment thereof will now be described with reference to the accompanying drawings wherein.

DETAILED DESCRIPTION

Figure 1:
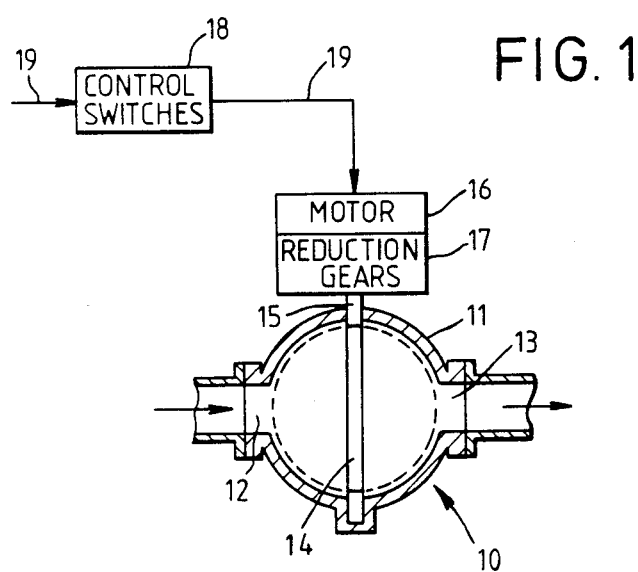
FIG. 1 is a schematic view of a motor driven butterfly valve.

Referring firstly to FIG. 1, there is shown a butterfly valve 10 suitable for controlling hydraulic and pneumatic flows in a chemical process plant such as an oil refinery. The valve 10 comprises a housing 11 having a fluid inlet 12 and an outlet 13. A valve member 14 in the form of a disc is rotatably mounted within the housing on a shaft 15, for rotation through 90° between an open position shown in dotted outline and the closed position shown. A suitable valve seat (not shown) may be provided within the housing 11 against which the disc 14 seats in the closed position. The valve disc 14 is rotated between the open and closed positions by a three phase synchronous electric motor 16 through reduction gearing 17. The motor 16 is driven by a three phase supply, and can be stopped, started and reversed by means of control switches 18 connected in power supply lines 19 to the motor. These switches 18 may be controlled electrically from a remote location, for example a control room.

Figure 2:
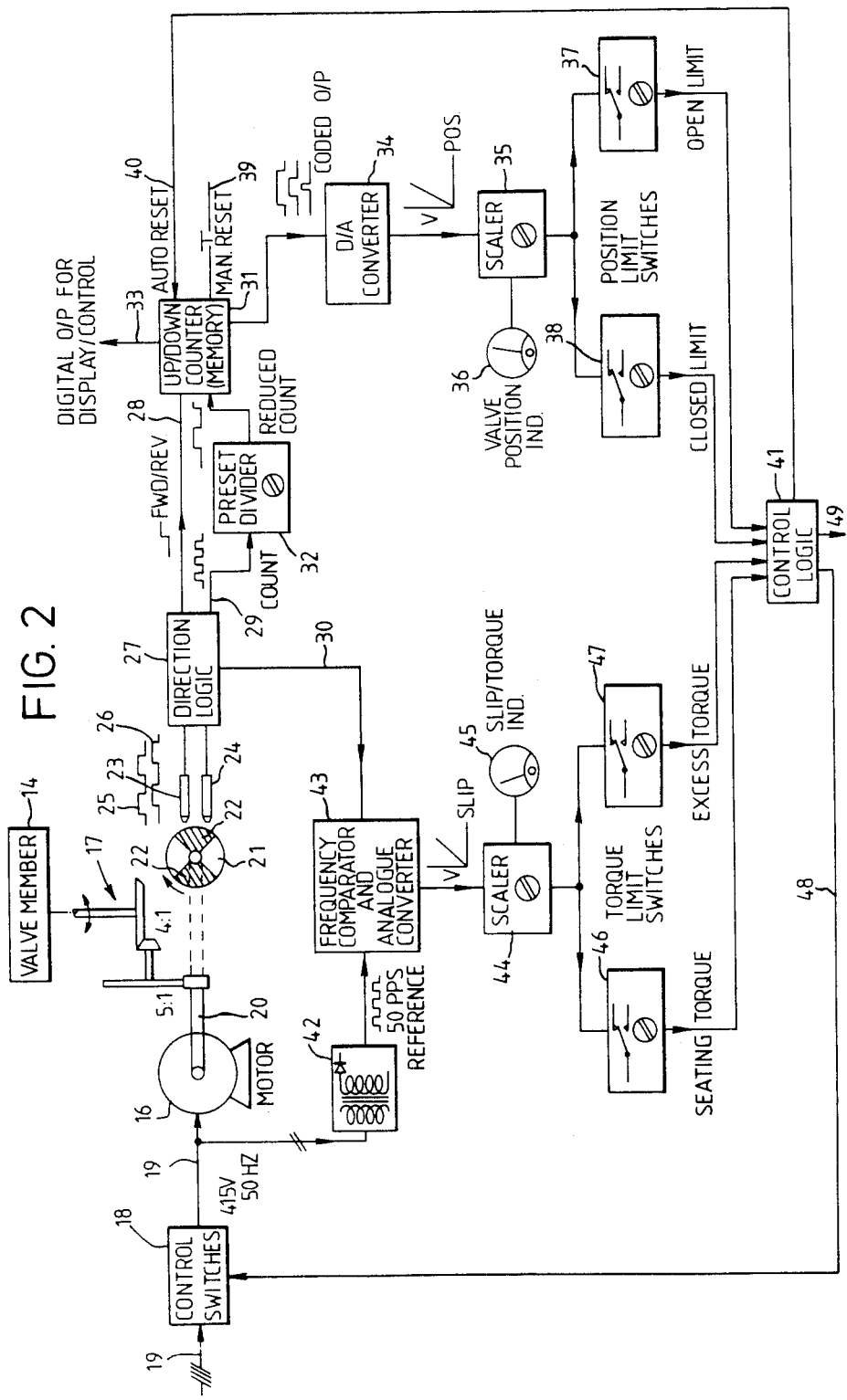
FIG. 2 is a schematic circuit diagram of a control system associated with the valve shown in FIG. 1.

Reference will now be made to FIG. 2, where a torque and movement control system for the motor 16 is shown.

The motor 16 has a shaft 20 which drives the reduction gearing 17.

Connected to the motor shaft 20 is an arrangement for detecting the rotation speed of the motor. The arrangement consists of a non-ferrous disc 21 mounted to rotate with the shaft 20 and on which is mounted a pair of magnets 22. Two Hall effect switches 23, 24 are mounted spaced apart in a stationary configuration so as to be switched by the magnets 22. Thus, considering the Hall effect switch 23 for example, it will be switched on as each magnet 22 rotates into proximity with the switch, and switches off when the magnets move away, thus producing a rectangular waveform as shown at 25, which includes two 180° spaced pulses for each rotation of the shaft 20, the frequency of the pulses being determined by the rotational speed of the shaft 20. The switch 24 produces a similar waveform 26 but because the switch 24 is spaced apart from the switch 23, the waveforms from the switches have a relative phase shift. This phase shift is so arranged that the rectangular pulses of the two waveforms overlap in time.

The phase shift is used to determine the sense of rotation of the shaft 20. A direction logic circuit 27 determines whether the rising edges of the pulses in the waveform 25 lead or lag those in the waveform 26 thereby to indicate if the motor is running in a forward or reverse direction. The output of the direction logic circuit is a binary signal on line 28, which is either 0 or 1 depending whether the motor is running in a forward or reverse direction.

The direction logic circuit 27 also provides an output on lines 29, 30 which corresponds to the waveform produced by one of the Hall effect switches 23, 24. The line 29 is connected to a circuit arrangement for sensing the displacement of the valve member 14, whereas the line 30 is connected to a circuit arrangement for sensing the motor torque.

The displacement sensing circuit consists of an up-/down counter 31 which counts pulses derived by the Hall effect switch 23. It will be appreciated that each pulse produced by the switch 23 is representative of a successive half revolution of the motor. The movement of the valve member 14 resulting from each revolution of the motor 16 will depend upon the gearing ratio of the reduction gearing 17. The effect of the reduction gearing is simulated by a programmable divider 32 which is set to divide the pulse rate on line 29 by a factor selected in dependence upon the reduction gearing ratio. The counter 31 counts the divided pulse rate from the divider 32, the count being accumulated upwardly or downwardly in dependence upon whether the motor is running in a forward or reverse direction as indicated by the signal on line 28. The resulting count in the counter 31 is thus representative of the position of the valve member.

The counter 31 is preferably of the nonvolatile type such that when the circuit is switched off, the valve position information is retained by the counter. Alternatively, the counter can be provided with a bias battery so that it is permanently energized.

The counter 31 provides on line 33 a digital output indicative of the count, which can be fed to a digital display or to remote valve position monitoring circuitry. For example in a process plant incorporating many such valves it is envisaged that it will be desirable to use a microprocessor responsive to many such outputs 33, to control the various valve motors 16 in dependence upon the valve positions so as to achieve a desired process control effect.

The digital output of the counter 31 is also fed to a digital to analogue converter 34 which produces an output voltage of a magnitude proportional to the accumulated count and hence the valve position. This voltage is fed to a scaler 35, typically a potentiometer and hence to an analogue meter 36, typically an analogue bar graph. The analogue voltage from the scaler 35 is also fed to position limit switch units 37, 38. The switch units 37, 38 establish respective preset reference voltages, the reference voltage for switch 37 representing the open limit for the valve and the reference voltage for switch 38 representing the closed limit. The output of the scaler 35 is compared by the switch units with the pre-set reference voltages and when equality is detected an appropriate one of the switch units 37, 38 will operate to provide an output signal. The output signals of the switches 37, 38 may be used to stop or reverse the motor 16 as will be explained hereinafter.

The counter 31 is provided with a manual reset control 39 and may also have an automatic reset 40 responsive to either the switch 37 or 38 via control logic 41 in order to prevent errors accumulating in the counter.

The torque sensing circuit will now be described. The synchronous motor 16 when only lightly loaded will run at a speed determined by the frequency of the bus power supply on line 19. Thus, assuming for the moment that the bus power frequency is constant, the motor will, after initial start up transients, run at a constant speed when lightly loaded. When the load increases, the motor develops more torque and the motor speed reduces commensurately. This speed reduction is indicative of the motor torque.

A reference signal indicative of the speed that the motor will assume under a light load is produced by monitoring the frequency of the bus supply to the motor. A single phase of the bus supply is fed to a circuit 42 including a step down transformer and rectifier which produces a rectangular pulse waveform of a frequency corresponding to the bus frequency. The frequency of the reference signal from the circuit 42 is compared with the frequency of the signal on line 30, which it will be appreciated is representative of the actual speed of the motor. The frequency comparison is effected by a circuit 43 which produces an analogue voltage of a magnitude indicative of the frequency difference and hence the motor torque. The voltage is fed through a scaler 44 to an analogue bar graph 45. The output of the scaler 44 is also fed to limit switches 46, 47 which operate in the same manner as switches 37, 38 and define a pre-set seating torque for the valve and an excess torque, respectively. The switches 46, 47 thus define when the torque exceeds a desired seating torque, and an excess torque greater than the seating torque, respectively.

The outputs of the switches 37, 38, 46, 47 are logically combined by the control logic 41 to define predetermined control situations for the motor. The control logic 41 provides an output on line 48 for operating the control switches 18 in response to fault conditions as indicated by the switches 37, 38, 46, 47.

In considering the control requirements it is necessary to bear in mind that the motor starting torque is likely to be greater than the required seating torque. This higher torque will appear at both ends of the travel of the valve member 14 when starting the motor, and at any other starting position within the travel. The circuit 41 therefore includes means for distinguishing between starting and closing torques, for example by ignoring the high torques on start up, for a limited period. Also, the control logic 41 may operate the switches 18 in a manner to reverse the valve member 14 away from an obstruction in order to release it, if desired. One or two further attempts to open or close the valve may then be made and if this does not clear the obstruction an alarm signal is generated on line 49.

The torque sensing circuit can be modified for use with a hydraulic motor rather than the described electric motor 16, in which case the reference signal indicative of the lightly loaded motor speed would be derived by monitoring the supply pressure of hydraulic fluid to the motor. Alternatively if it can be assumed that the motor will always run at a constant speed when lightly loaded, the reference signal can be independently generated without monitoring the input energy to the motor. The advantage of monitoring the supply is that the value of the reference signal is automatically adjusted to take account of speed changes resulting from changes in the supply of power to the motor.

It will be appreciated that in the described circuit the limits of travel and torque for the valve are defined electrically and can be readily adjusted without the need for complicated mechanical adjustments as in the prior art. Also, the circuit can be used with different reduction gear ratios by adjusting the setting of the divider 32. Thus one circuit design can be used for different size and model valve motors and gearings.

Many modifications and variations falling within the scope of the invention are possible. For example certain models of digital counter will automatically perform the function of the direction logic 27, in which case the logic circuit 27 can be dispensed with. Also, whilst the displays 36, 45 and the switches 37, 38, 46, 47 have been described as analogue devices, they could operate digitally if desired.

Furthermore, in a chemical process plant, many such valve arrangements as described herein may be utilised and it may be desirable to control the valves automatically for example, utilising a microprocessor such that if one valve becomes jammed certain of the other valves are automatically opened or closed to maintain the plant in a safe condition. For such an arrangement, the outputs of switches 37, 38, 46, 47 from a plurality of valves may be fed as inputs to a microprocessor, which provides outputs to the control switches 18 of the valves, so that each valve is controlled not only in dependence upon its own condition but also in dependence upon the condition of other valves in the plant.

We claim:

1. In a motor-operated valve assembly including a valve housing (11) including inlet (12) and outlet (13) openings communicating with a chamber, a valve member (14) mounted in said chamber for movement between open and closed positions for controlling the flow of fluid between the inlet and outlet openings, and synchronous motor means for driving the valve member between its open and closed position; means for controlling the torque exerted by the motor, comprising
    (a) means (42) for producing a reference frequency signal corresponding with the power supplied to the motor under a given load condition;
    (b) means (21, 22, 23, 30) for producing an actual speed signal the frequency of which corresponds with the actual speed of the motor;
    (c) comparing means (43) for comparing the frequencies of said reference and actual speed signals to produce an analog torque signal corresponding with the torque developed by the motor;
    (d) torque limiting means (46, 47) for comparing the torque signal with a preset value and for providing an output signal when the motor torque exceeds a given value; and
    (e) means (41, 18) responsive to said output signal for controlling the driving power to said motor means so as to control the motor torque to said given value such that the motor means is prevented from exerting excessive torque on said valve means.

2. Apparatus as defined in claim 1, wherein said torque limiting means (46, 47) comprises a torque limit switch (46) operable when the torque signal reaches said preset valve.

3. Apparatus as defined in claim 1, wherein said actual motor speed signal is a cyclic position signal such that successive cycles thereof are indicative of successive incremental units of movement of said valve member by said motor means; and further including counter means (31) for counting the cycles of said position signal to provide an indication of said valve member movement.

4. Apparatus as defined in claim 3, and further including means (27) for discriminating between forward and reverse movement of said motor means, said discriminating means being operable to increase and decrease the count in said counter means in accordance with the forward and reverse movement of said motor means, respectively.

5. Apparatus as defined in claim 4, and further including at least one position limit switch (37, 38) operable when the count of said counter means reaches a given value.

6. Apparatus as defined in claim 5, and further including reduction gearing means (17) connecting said motor means with said valve member, and programmable divider means (32) for reducing the frequency of the cyclic signal supplied to said counter means by a factor that is a function of the reduction gearing ratio.

7. Apparatus as defined in claim 6, wherein said means for producing said actual speed signal includes at least one permanent magnet (22), means (21) driven by said motor for moving said magnet in a rotary path, and a Hall effect switch (23, 24) mounted adjacent said rotary path for cyclic operation by said magnet during the rotation thereof.

* * * * *